United States Patent
King, II et al.

(10) Patent No.: US 9,439,051 B2
(45) Date of Patent: *Sep. 6, 2016

(54) SYSTEM FOR PROVIDING INTERNET ACCESS TO AN AUTOMOTIVE VEHICLE HAVING A MULTIMEDIA DEVICE

(75) Inventors: Charles Joseph King, II, Saline, MI (US); Paul Werner, Troy, MI (US)

(73) Assignees: Toyota Motor Engineering & Manufacturing North America, Inc., Erlanger, KY (US); Harman Becker Automotive Systems Inc., Farmington Hills, MI (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/560,503

(22) Filed: Jul. 27, 2012

(65) Prior Publication Data
US 2013/0059571 A1    Mar. 7, 2013

Related U.S. Application Data

(60) Provisional application No. 61/530,008, filed on Sep. 1, 2011.

(51) Int. Cl.
| | |
|---|---|
| *H04W 4/18* | (2009.01) |
| *H04W 4/00* | (2009.01) |
| *H04W 88/04* | (2009.01) |
| *H04L 29/08* | (2006.01) |

(52) U.S. Cl.
CPC ............... *H04W 4/18* (2013.01); *H04L 67/12* (2013.01); *H04W 4/008* (2013.01); *H04W 88/04* (2013.01)

(58) Field of Classification Search
CPC ......... H04M 1/7253; H04M 2250/02; H04M 1/6075; H04W 8/005; H04W 4/008; H04W 4/18; H04W 88/04; G06F 1/1613; H04B 1/3877; B60R 11/0241; H04L 67/12
See application file for complete search history.

(56) References Cited

U.S. PATENT DOCUMENTS

| | | |
|---|---|---|
| 4,513,405 A | 4/1985 | Hills |
| 5,127,057 A | 6/1992 | Chapman |
| 5,339,362 A | 8/1994 | Harris |
| 5,572,442 A | 11/1996 | Schulhof et al. |
| 6,055,478 A | 4/2000 | Heron |
| 6,130,727 A | 10/2000 | Toyozumi |
| 6,147,938 A | 11/2000 | Ogawa et al. |
| 6,148,253 A | 11/2000 | Taguchi et al. |
| 6,434,450 B1 | 8/2002 | Griffin, Jr. et al. |

(Continued)

FOREIGN PATENT DOCUMENTS

| | | |
|---|---|---|
| AU | 2002100304 A4 | 6/2002 |
| JP | 11-317063 A | 11/1999 |
| JP | 2000333271 A | 11/2000 |

*Primary Examiner* — Marisol Figueroa
(74) *Attorney, Agent, or Firm* — Dinsmore & Shohl LLP

(57) ABSTRACT

A system for accessing the Internet from an automotive vehicle having a multimedia device is provided. The system includes a mobile phone equipped with a wireless transceiver. The wireless transceiver has a data-only channel operable to transmit data between the mobile phone and the multimedia device. A first application is disposed within the mobile phone. The first application is operable to access an Internet website. A data processor is operable to transmit the Internet website to the multimedia device in data form through the data-only channel. A second application is disposed within the multimedia device and is operable to process the data received through the data-only channel so as to display the website onto the multimedia device.

10 Claims, 2 Drawing Sheets

(56) References Cited

U.S. PATENT DOCUMENTS

| | | |
|---|---|---|
| 6,608,399 B2 | 8/2003 | McConnell et al. |
| 6,675,232 B1 | 1/2004 | Sato et al. |
| 6,721,236 B1 | 4/2004 | Eschke et al. |
| 6,772,212 B1 | 8/2004 | Lau et al. |
| 6,799,201 B1 | 9/2004 | Lee et al. |
| 6,812,942 B2 | 11/2004 | Ribak |
| 6,984,784 B2 | 1/2006 | Nagasaka et al. |
| 6,990,208 B1 | 1/2006 | Lau et al. |
| 7,089,546 B2 | 8/2006 | Watanabe et al. |
| 7,139,660 B2 | 11/2006 | Sarkar et al. |
| 7,203,751 B2 | 4/2007 | Yasushi et al. |
| 7,215,784 B1 | 5/2007 | Pham et al. |
| 7,324,833 B2 | 1/2008 | White et al. |
| 7,346,435 B2 | 3/2008 | Amendola et al. |
| 7,379,541 B2 | 5/2008 | Iggulden et al. |
| 7,406,340 B2 | 7/2008 | Juengling et al. |
| 7,634,228 B2 | 12/2009 | White et al. |
| 7,733,659 B2 | 6/2010 | Snider et al. |
| 7,769,346 B1 | 8/2010 | Van Order et al. |
| 7,778,595 B2 | 8/2010 | White et al. |
| 7,815,100 B2 | 10/2010 | Adams et al. |
| 7,881,702 B2 * | 2/2011 | Heyworth et al. ......... 455/414.1 |
| 2004/0019416 A1 | 1/2004 | Chen et al. |
| 2004/0110472 A1* | 6/2004 | Witkowski ............ G07C 5/008 455/41.2 |
| 2004/0121748 A1 | 6/2004 | Glaza |
| 2004/0165734 A1 | 8/2004 | Li |
| 2005/0044574 A1 | 2/2005 | Lau et al. |
| 2005/0085965 A1 | 4/2005 | Issa et al. |
| 2005/0132024 A1 | 6/2005 | Habaguchi et al. |
| 2005/0221878 A1 | 10/2005 | Van Bosch et al. |
| 2005/0283284 A1 | 12/2005 | Grenier et al. |
| 2006/0015221 A1 | 1/2006 | Sarkar et al. |
| 2006/0036356 A1 | 2/2006 | Rasin et al. |
| 2006/0143697 A1* | 6/2006 | Badenell et al. ............... 726/10 |
| 2006/0277555 A1 | 12/2006 | Howard et al. |
| 2007/0126604 A1 | 6/2007 | Thacher |
| 2007/0142024 A1 | 6/2007 | Clayton et al. |
| 2007/0143798 A1 | 6/2007 | Jira et al. |
| 2007/0293183 A1 | 12/2007 | Marlowe |
| 2008/0007120 A1 | 1/2008 | Weyl et al. |
| 2008/0127160 A1 | 5/2008 | Rackin et al. |
| 2008/0130912 A1 | 6/2008 | Marlowe |
| 2008/0143892 A1 | 6/2008 | Lytell |
| 2008/0246850 A1 | 10/2008 | Marlowe |
| 2008/0248742 A1 | 10/2008 | Bauer et al. |
| 2009/0068950 A1 | 3/2009 | Tkachenko et al. |
| 2009/0079555 A1 | 3/2009 | Aguirre De Carcer et al. |
| 2009/0119657 A1 | 5/2009 | Link, II |
| 2009/0138942 A1 | 5/2009 | Alrabady et al. |
| 2009/0176469 A1 | 7/2009 | Nagara et al. |
| 2009/0203349 A1* | 8/2009 | Hollstien ............. G08B 25/016 455/404.1 |
| 2010/0037057 A1 | 2/2010 | Shim et al. |
| 2010/0082559 A1 | 4/2010 | Sumcad et al. |
| 2010/0125387 A1 | 5/2010 | Sehyun et al. |
| 2010/0128890 A1 | 5/2010 | Boulia |
| 2010/0162168 A1* | 6/2010 | Lee et al. ...................... 715/821 |
| 2010/0203823 A1 | 8/2010 | Apaar |
| 2010/0273477 A1* | 10/2010 | Namaky ................... 455/426.1 |
| 2010/0311345 A1 | 12/2010 | Santori et al. |
| 2010/0330975 A1 | 12/2010 | Basir |
| 2011/0093135 A1 | 4/2011 | Moinzadeh et al. |
| 2011/0275358 A1* | 11/2011 | Faenger ....................... 455/420 |
| 2013/0059571 A1* | 3/2013 | King, II ................. H04W 4/18 455/414.1 |

\* cited by examiner

SYSTEM FOR PROVIDING INTERNET ACCESS TO AN AUTOMOTIVE VEHICLE HAVING A MULTIMEDIA DEVICE

CROSS-REFERENCE TO RELATED APPLICATIONS

This application claims the benefit of U.S. Provisional Application 61/530,008 filed on Sep. 1, 2011, the disclosure of which is incorporated by reference herein in its entirety.

FIELD OF THE INVENTION

The invention relates to a system for use in an automotive vehicle having a multimedia device. The system includes a mobile phone equipped with a wireless transceiver. The wireless transceiver includes a data-only channel operable to transmit data between the mobile phone and the multimedia device. The system is operable to provide Internet access to the multimedia device.

BACKGROUND OF THE INVENTION

Automotive vehicles are equipped with a multimedia device. The multimedia device is typically found on the instrument panel of a vehicle disposed between the front driver and front passenger seat. The multimedia device may include functions for facilitating navigation as well as multimedia applications such as satellite radio, am/fm radio and the like.

Currently some multimedia devices are operable to receive and access the Internet. Internet access is achieved by wireless communication through a user's mobile phone, or through a transceiver embedded in the multimedia device. In instances where internet is accessed through a mobile phone, the mobile phone is equipped with a wireless communication system such as Bluetooth.

Bluetooth is a wireless technology standard for wirelessly exchanging data over short distances. Bluetooth was created as an alternative to serial cables to connect both fixed and mobile devices to create localized networks. Bluetooth includes a plurality of profiles. Some of the profiles are operable to transmit in, what is called by those skilled in the art, "data over data" through a Personal Area Network (PAN) or a Dial Up Network (DUN).

Through such networks the mobile phone is able to directly access the Internet and transmit a website or Internet content onto the multimedia device, this is commonly referred to as "tethering" by those skilled in the art. An example of which is shown in FIG. 1, wherein the lightning bolts represent internet access. Access to such networks currently comes at a cost to the user. Namely, mobile phone providers and service carriers charge users for the amount of data that is transmitted through PAN or the DUN. Accordingly, it remains desirable to have a multimedia device operable to receive Internet content without incurring the price of data transmission.

SUMMARY OF THE INVENTION

According to one aspect of the invention a system for accessing the Internet from an automotive vehicle having a multimedia device is provided. The system includes a mobile phone equipped with a wireless transceiver. The wireless transceiver includes a data-only channel operable to transmit data between the mobile phone and the multimedia device.

A first application is disposed within the mobile phone. The first application is operable to access an Internet website. A data processor is operable to transmit the Internet website to the multimedia device in data form through the data-only channel. A second application is disposed within the multimedia device. The second application is operable to process the data received through the data-only channel so as to display the website onto the multimedia device thereby eliminating the need to transmit data/access the internet through a cost based wireless network such as PAN or DUN.

The wireless transceiver may be a Bluetooth transceiver and the data-only channel may be a data-only channel commonly referenced as a Serial Port Profile (SPP). The Serial Port Profile is operable to transfer data-only between a first and a second device. Specifically, the Serial Port Profile is operable to transfer data between the mobile phone and the multimedia device.

The first application may include a list having a predetermined numbers of websites. The first application is further operable to gather the user's personal information stored on the user's mobile phone. For use herein, "personal information" refers to information of a particular person that is necessary to validate the user's identity, to include but not limited to the user's login identification and its associated password, and answers to questions selected by the user.

The system includes an input operable to select one of the predetermined websites. The input may be disposed on one of either the mobile phone or the multimedia device.

The data processor is operable to transmit the user's personal information to the selected website so as to verify the user's identity. Further, each of the plurality of websites may be operable to cache a user's personal data for validation.

The system may further include a database. The database has the user's personal information. The first application may be operable to transmit the user's personal information gathered from the database to the selected website so as to validate the user's identification and actuate the website in accordance with the user's cached information.

The system may further include a host. The host is operable to store a user's personal information and actuate selected websites so as to facilitate the transmission and collection of data from the website.

The first application receives the data from the host and transmits the data through the data-only channel to the second application. The second application is operable to execute a plurality of commands so as to process the data and compile it in the form of the website to be displayed on the multimedia device. Accordingly, the system is operable to provide Internet access to the multimedia device without having to utilize cost based networks such as PAN and DUN.

BRIEF DESCRIPTION OF THE DRAWINGS

Advantages of the present invention will be readily appreciated as the same becomes understood by reference to the following detailed description when considered in connection with the accompany drawings wherein.

DETAILED DESCRIPTION OF THE INVENTION

Figure 1:
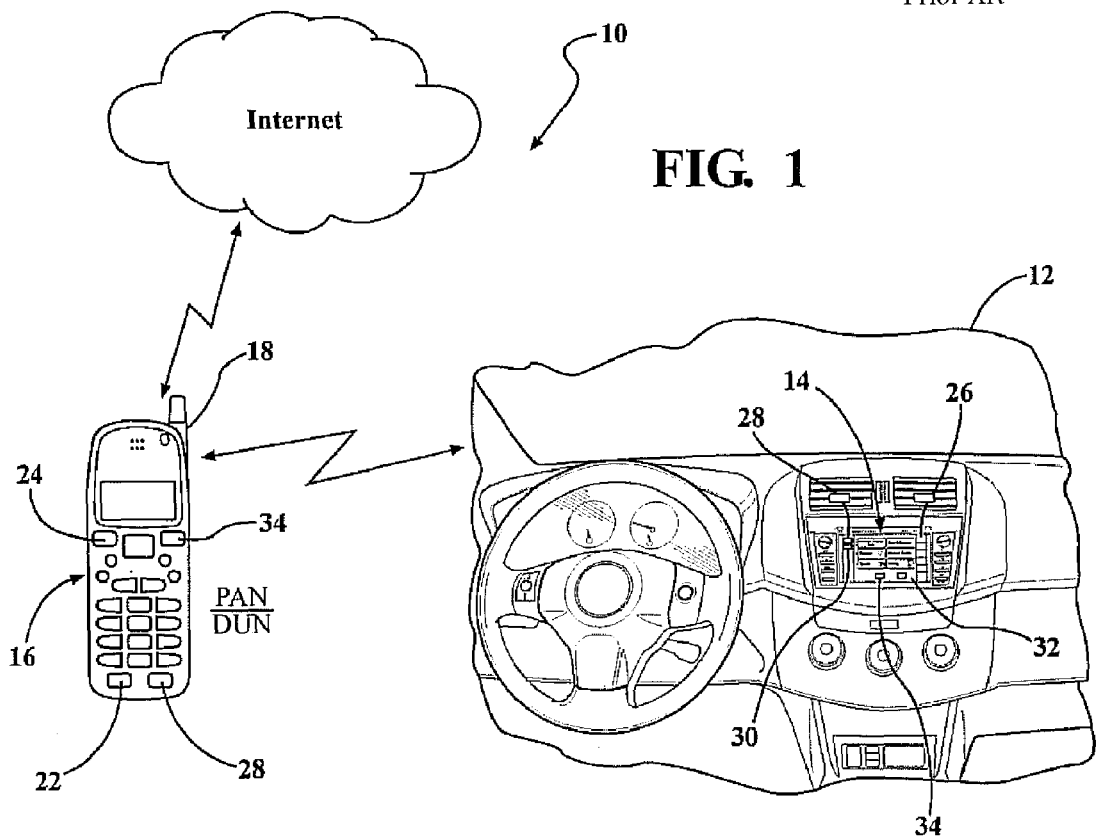
FIG. 1 is a systematic view of a head unit accessing the Internet through a personal area network or a DUN network.
Figure 2:
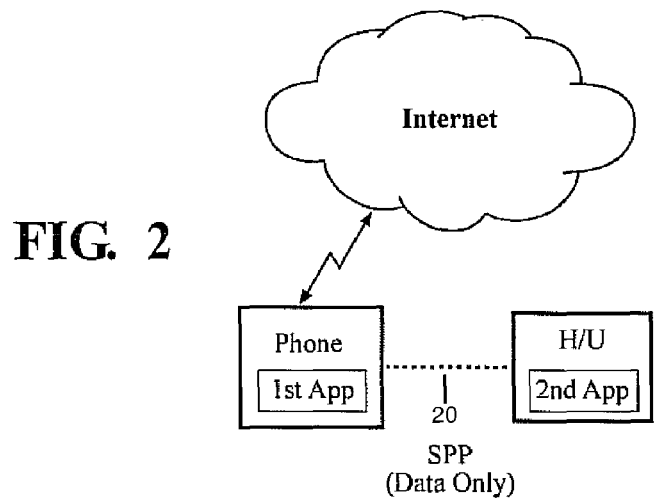
FIG. 2 is a systematic view of a system of the present invention.
Figure 3:
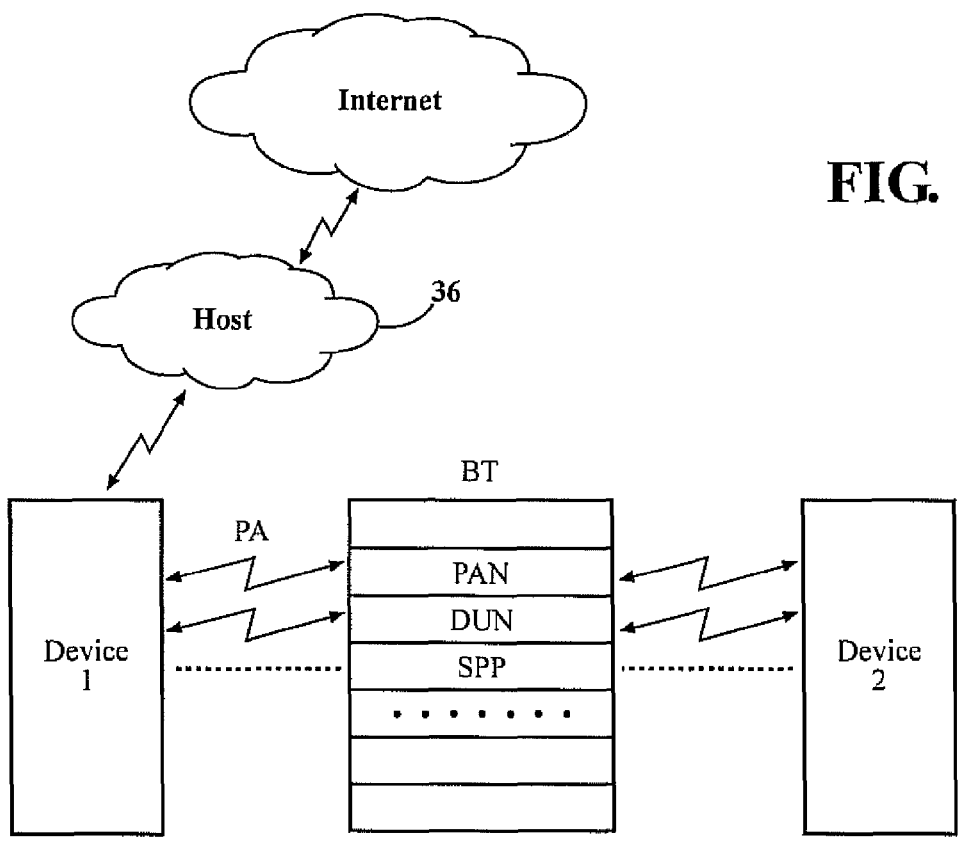
FIG. 3 is a diagram showing the various data-only channels in a Bluetooth transceiver.

With reference first to FIG. 2, a system 10 for accessing the Internet from an automotive vehicle 12 having a multimedia device 14 is provided. The multimedia device 14 may be disposed on the instrument panel of the vehicle 12 and includes media functions such as a camera for parking assist, a navigation unit, a satellite radio unit, an am/fm radio unit, and a CD player or DVD player.

The system 10 includes a mobile phone 16 equipped with one or more wireless transceivers 18. The wireless transceiver 18 is operable to send and receive data and voice communications over open space. The wireless transceiver 18 is capable of sending and receiving a variety of different radio signals over a broad range of frequencies and may include the ability to send/receive radio signals in the FM radio band, cellular communication standard frequency bands, GPS, Bluetooth, etc. Radio signals are capable of sending both voice and data information using one or more voice or data channels and combinations thereof. Some cellular communication radio signals may be able to access the Internet using both voice and data channels. Some transceivers are capable of only transmitting limited amounts of voice and data communications over short ranges.

At least one of the Bluetooth channels is a data-only channel 20, operable only to transmit data between the mobile phone 16 and the multimedia device 14. With reference again to FIG. 2, data-only transmission is shown as a dotted line. Specifically, the Bluetooth data-only channel 20 is not Internet accessible. It should be appreciated by those skilled in the art that the mobile phone 16 is equipped with a transceiver 18 which is operable to access the Internet.

For example, the wireless transceiver 18 may be a Bluetooth transceiver 18 equipped with multiple Bluetooth profiles. Some of the Bluetooth profiles are operable to provide internet access. One of the Bluetooth profiles is a Serial Port Profile (SPP). It should be understood by those skilled in the art that the Serial Port Profile is operable only to connect the mobile phone 16 to another device and transmit data therethrough wirelessly similar to the way in which data is transmitted from one device to another through a hard line such as a universal serial bus cord.

A first application 22 is disposed within the mobile phone 16. The first application 22 is operable to access a website from the internet. More specifically, the first application 22 is operable to execute a plurality of commands one of which is to cause the phone to access the Internet and retrieve the website. The first application 22 may further include a list 24 having a predetermined numbers of websites. The first application 22 may be programmable so as to allow a user to input 26 a predetermined number of desired websites. The first application 22 thus enables the mobile phone 16 to access any of the predetermined websites on the list 24.

A data processor 28 may further encode and/or compile the retrieved website into a simpler data form. It should be appreciated by those skilled in the art, that the data may be encrypted to add security to the process. The data processor 28 is further operable to transmit the Internet website to the multimedia device 14 in data form through a wireless data channel. The data processor 28 is also operable to execute one or more applications 22, 30, which, when executed may decode the encoded website data sent from the mobile phone 16 and encode this data to be sent to the multimedia device 14.

Alternatively, the data processor 28 may decode the encoded data signals from the mobile phone 16 and send these decoded signals directly to the multimedia device 14. The data processor 28 of the auxiliary device is ideally similar to mobile device processors in that the processing requirements of a multimedia enabled mobile device are less than that of a larger device like a home PC. The processor of the auxiliary device, like mobile chipsets, ideally has a low power consumption. Known mobile chipsets employing lower power, reduced instruction set computing (RISC) employ ARM architecture.

A second application 30 is disposed within the multimedia device 14, referenced in FIG. 2 as the H/U, (Head Unit). The second application 30 executes a script operable to process the data received through the data channel so as to display the website onto the display screen 32 of a multimedia device 14.

Figure 4:
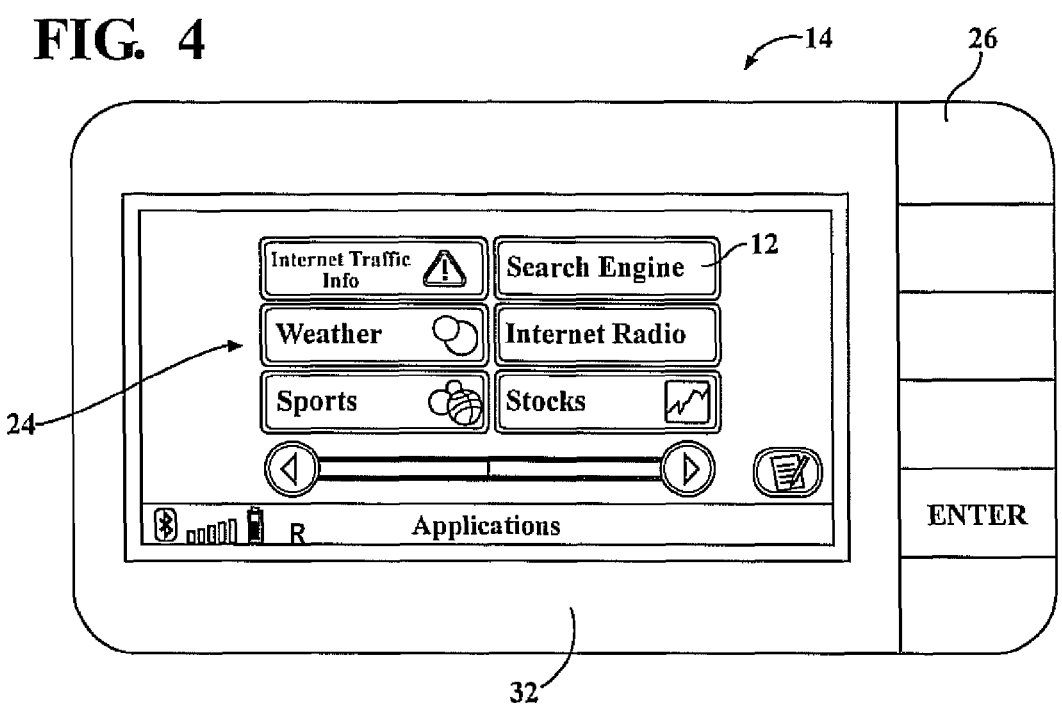
FIG. 4 is a perspective view of the display screen of a multimedia device showing the list of websites available for selection.

The system 10 further includes an input 26 operable to select one of the predetermined websites. The input 26 may be further operable to input 26 data into the website. As shown in FIG. 4, the input 26 may be a plurality of inputs 26 with indicia indicating the selected function. For illustrative purposes, the Internet may be accessed on the multimedia device 14 by actuating the input 26 labeled with "Internet."

The multimedia device 14 may further include an input 26 operable to move a pointer around the display screen 32 so as to select one of the available websites. It should also be appreciated by those skilled in the art that the multimedia device 14 may have an input 26 consisting of a touch screen wherein the user may simply touch the displayed website for access and selection.

It should also be appreciated by those skilled in the art that the input 26 may be disposed on one of either the mobile phone 16 or the multimedia device 14 or both. Thus the user may use the mobile phone 16 as a remote to select the website to be displayed on the multimedia device 14. This may be preferable when the user is a passenger in the rear seat. Thus, the rear seat passenger can manipulate the multimedia device 14 remotely so as to change radio stations or switch between different websites available in the first application 22 such as a music playing website or a traffic information providing website.

The first application 22 may be further operable to gather the user's personal information. The user's personal information may be inputted into the user's mobile phone 16 and stored on the user's mobile phone 16.

The data processor 28 is operable to transmit the user's personal information to the selected website so as to verify the user's identity. The websites are operable to cache the user's personal data for validation.

The system 10 may further include a database 34. The database 34 may store a user's personal information. Specifically, the database 34 may store the user's login and passwords for each of the respective websites stored in the first application 22.

The first application 22 is further operable to process the database 34 so as to transmit the user's personal data to the selected website so as to validate the user's identification. For instance, upon selection of the Pandora website the user's login information and password are automatically sent to the Pandora website thus allowing the user access to the website wherein the website is delivered to the multimedia device 14 having displayed the user's past music selection preferences, the user's created music lists 24, and the like.

The system 10 may further include a host 36. The host 36 is a remote server operable to receive the selected website requested by the user. The host 36 is further operable to pull the website information from the Internet, process it, compile it, and transmit it in data form to the first application 22 wherein the first application 22 transmits the data through the data channel to the second application 30.

The system 10 provides a multimedia device 14 with the ability to access the internet using a user's cost free data-only channel 20. In operation a user actuates the input 26 button on the multi-media device configured to provide a home screen showing a plurality of predetermined Internet websites, as shown in FIG. 4. The websites are programmed into the first application 22 in the form of URLs.

The user may browse through the available websites and select the desired website. Selection may be done using an input 26 provided on the multimedia device 14, mobile phone 16, or through voice command. Upon selection of a website, the first application 22 gathers the user's personal information and transmits it, along with the selected website to the internet.

The website processes the user's personal data and validates the user's access so as to allow the user to browse the website. Once validation is completed the first application 22 encodes the website into a readable data form.

The readable data is transmitted through the data channel to the multimedia device 19. The second application 30 is stored on the multimedia device 14 and is operable to process the data received through the data channel so as to display the website in a readable and functional manner. Inputs 26 available on either the mobile phone 16 or the multimedia device 14 may be actuated so as to manipulate the selected website.

In instances where the system 10 utilizes a host 36, the first application 22 transmits the selected website along with the user's personal information to the host 36. The host 36, then retrieves the website and transmits the selected website in a compressed form to the first application 22. Thus, in instances where the selected website includes a relatively tremendous amount of data, the compressed form may be more suited for environments with limited processing capabilities such as current multimedia devices 14.

The compressed readable data is transmitted through the data channel to the multimedia device 14. The second application 30 is stored on the multimedia device 14 and is operable to process the data received through the data channel so as to display the website in a readable and functional manner. Inputs 26 available on either the mobile phone 16 or the multimedia device 14 may be actuated so as to manipulate the selected website.

The invention claimed is:

1. A system for accessing the internet from an automotive vehicle, the automotive vehicle having a multimedia device, the system comprising:
   a mobile phone configured to access the internet, the mobile phone equipped with a wireless transceiver, the wireless transceiver configured to transmit data over a short-wavelength UHF radio waves and includes a plurality of channels, wherein one of the plurality of the channels is a data over data channel, the data over data channel is configured to monitor data accessed from the internet and another one of the plurality of channels is a data-only channel, the data-only channel is configured to wirelessly transmit data between the mobile phone and the multimedia device, wherein data transmitted over the data-only channel is not monitored; and
   a first application disposed within the mobile phone, the first application operable to access an internet website through the data over data channel;
   a data processor operable to encode the internet website from the data over data channel to a data form and transmit to the multimedia device in data form through the data-only channel; and
   a second application disposed within the multimedia device, the second application operable to process the data form received through the data-only channel so as to display the website onto the multimedia device, wherein costs associated with accessing data from the internet are reduced as such data is not monitored.

2. The system as set forth in claim 1, wherein the data-only channel is a Serial Port Profile.

3. The system as set forth in claim 1, wherein the wireless transceiver is configured to transmit data over a short-wavelength UHF radio waves in the ISM band from 2.4 to 2.485 GHz.

4. The system as set forth in claim 1, wherein the first application includes a list of predetermined numbers of websites.

5. The system as set forth in claim 3, further including an input operable to select one of predetermined websites.

6. The system as set forth in claim 4, wherein the first application is operable to gather the user's personal information stored on the user's mobile phone, the data processor operable to transmit the user's personal information to the selected website so as to verify the user's identity.

7. The system as set forth in claim 5, wherein each of the plurality of websites are operable to cache a user's personal data for validation.

8. The system as set forth in claim 5, further including a database, the database having a user's personal information, the first application operable to transmit the user's personal data to the selected website so as to validate the user's identification and actuate the website in accordance with the user's cached information.

9. The system as set forth in claim 4, wherein the input is disposed on one of either the mobile phone, or the multimedia device.

10. The system as set forth in claim 5, further including a host, the host operable to store a user's personal information, the mobile phone in communication with the host, the host operable to actuate the selected website and transmit the website through the mobile phone onto the multimedia device via the data-only channel.

* * * * *

UNITED STATES PATENT AND TRADEMARK OFFICE
CERTIFICATE OF CORRECTION

PATENT NO. : 9,439,051 B2  
APPLICATION NO. : 13/560503  
DATED : September 6, 2016  
INVENTOR(S) : Charles Joseph King, II et al.

It is certified that error appears in the above-identified patent and that said Letters Patent is hereby corrected as shown below:

IN THE SPECIFICATION

In Column 5, Line 30, delete "to the multimedia device 19." and insert --to the multimedia device 14.--, therefor.

Signed and Sealed this  
Eighth Day of November, 2016

Michelle K. Lee  
*Director of the United States Patent and Trademark Office*